US00RE39474E

(19) United States
(12) Reissued Patent
Hashizume et al.

(10) Patent Number: US RE39,474 E
(45) Date of Reissued Patent: Jan. 23, 2007

(54) METHOD OF MANUFACTURING AN INK JET RECORDING HEAD HAVING REDUCED STRESS CONCENTRATION NEAR THE BOUNDARIES OF THE PRESSURE GENERATING CHAMBERS

(75) Inventors: Tsutomu Hashizume, Nagano-ken (JP); Tetsushi Takahashi, Nagano-ken (JP); Akira Matsuzawa, Nagano-ken (JP)

(73) Assignee: Seiko Epson Corporation, Tokyo (JP)

(21) Appl. No.: 10/319,491

(22) Filed: Dec. 16, 2002

Related U.S. Patent Documents

Reissue of:
(64) Patent No.: 6,089,701
Issued: Jul. 18, 2000
Appl. No.: 08/835,748
Filed: Apr. 10, 1997

U.S. Applications:
(62) Division of application No. 09/742,393, filed on Dec. 22, 2000, now abandoned.

(30) Foreign Application Priority Data

Apr. 10, 1996 (JP) ..... 8-88469
Dec. 9, 1996 (JP) ..... 8-344568
Mar. 17, 1997 (JP) ..... 9-83245

(51) Int. Cl.
*B41J 2/045* (2006.01)
*H04R 17/00* (2006.01)

(52) U.S. Cl. ..... 29/25.35; 29/890.1; 347/70
(58) Field of Classification Search ..... 29/25.35, 29/890.1, 846; 347/68, 70, 71, 72; 310/328
See application file for complete search history.

(56) References Cited

U.S. PATENT DOCUMENTS 4,296,421 A * 10/1981 Hara et al. ..... 347/68 X
4,516,140 A * 5/1985 Durkee et al. ..... 347/71
4,588,998 A * 5/1986 Yamamuro et al. ..... 347/68

(Continued)

FOREIGN PATENT DOCUMENTS

DE 4443254 * 12/1995
EP 0572230 * 12/1993
EP 698490 A2 2/1996

(Continued)

OTHER PUBLICATIONS

Berchtold et al, "Simulation of a Drop–On–Demand Print Head with Planar Piezoelectric Transducer", VLSI and Microelectronic Applications in Intelligent Peripherals and their Interconnection Networks', pp. 2/53–2/55, May 1989.*

(Continued)

*Primary Examiner*—A. Dexter Tugbang
(74) *Attorney, Agent, or Firm*—Sughrue Mion, PLLC

(57) ABSTRACT

[An] *A method of manufacturing an* ink-jet recording head [comprising:] *which includes* an elastic sheet [providing] *facing* pressure generating chambers[;], nozzle orifices, each communicating with the pressure generating chambers[;], *and* piezoelectric vibrators formed on the elastic sheet, each of the piezoelectric vibrators having, a lower electrode formed on the elastic sheet, *the method including forming* a piezoelectric layer [formed] on the lower electrode, and *forming* an upper electrode [formed] on the piezoelectric layer such that the [upper electrode faces the respective pressure generating chamber, wherein the] *area where the lower electrode, piezoelectric layer and upper electrode overlap is located within an area defined by the pressure generating chamber in the longitudinal direction thereof. The* upper electrodes of the piezoelectric vibrators are positioned independently of each other[;] *and* an electrical insulator layer having windows[, wherein the electrical insulator layer covers] *is formed to cover* the upper electrodes[;], and a conductor pattern [connecting with] *is connected to* the upper electrodes via the windows of the electrical insulator layer.

40 Claims, 7 Drawing Sheets

U.S. PATENT DOCUMENTS

| | | | | | |
|---|---|---|---|---|---|
| 4,897,673 | A | * | 1/1990 | Okabayashi et al. | 347/68 |
| 5,210,455 | A | * | 5/1993 | Takeuchi et al. | 310/328 |
| 5,265,315 | A | | 11/1993 | Hoisington et al. | |
| 5,459,501 | A | * | 10/1995 | Lee et al. | 347/68 |
| 5,530,465 | A | | 6/1996 | Hasegawa et al. | |
| 5,872,583 | A | * | 2/1999 | Yamamoto et al. | 347/71 X |

FOREIGN PATENT DOCUMENTS

| | | | | |
|---|---|---|---|---|
| EP | 0698490 | | * | 2/1996 |
| EP | 736385 | A1 | | 10/1996 |
| GB | 2182611 | A | | 5/1987 |
| GB | 2282992 | B | | 4/1995 |
| JP | 57-167272 | A | | 10/1982 |
| JP | 59-164150 | | | 9/1984 |
| JP | 3-65350 | | * | 3/1991 |
| JP | 5-504740 | | * | 7/1993 |
| JP | 5-286131 | | * | 11/1993 |
| JP | 6-320723 | | | 11/1994 |
| JP | 8-112896 | A | | 5/1996 |
| WO | WO93/22140 | | | 11/1993 |

OTHER PUBLICATIONS

Patent Abstracts of Japan, vol. 9, No. 14, Jan. 22, 1985, JP 59 164150 A (Nippon Denki K.K.).*

Patent Abstracts of Japan, vol. 15, No. 57, Feb. 12, 1991, JP 02 289352 A (Seiko Epson Corp.).*

Patent Abstracts of Japan, vol. 7, No. 9, Jan. 14, 1983, JP 57 167272 A (Hitachi Seisakusho K.K.).*

Patent Abstracts of Japan, vol. 4, No. 179, Dec. 11, 1990, JP 55 126463 A (Ricoh K.K.).*

Patent Abstracts of Japan, vol. 8, No. 197, Sep. 11, 1984, JP 59 087167 A (Ricoh K.K.).*

* cited by examiner

FIG. 5 - I
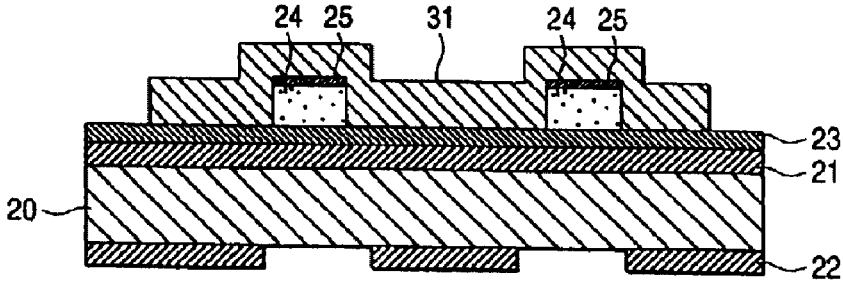
FIG. 5 - II
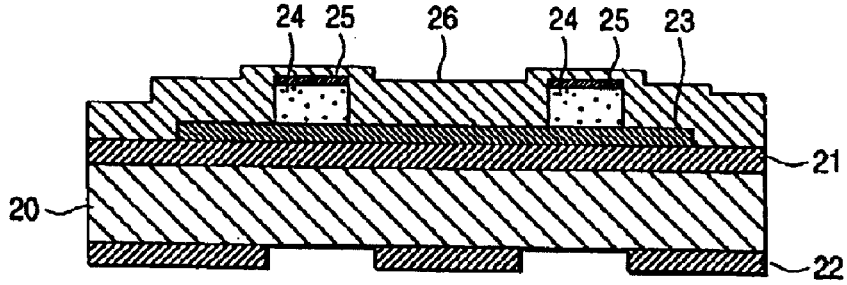
FIG. 5 - II'
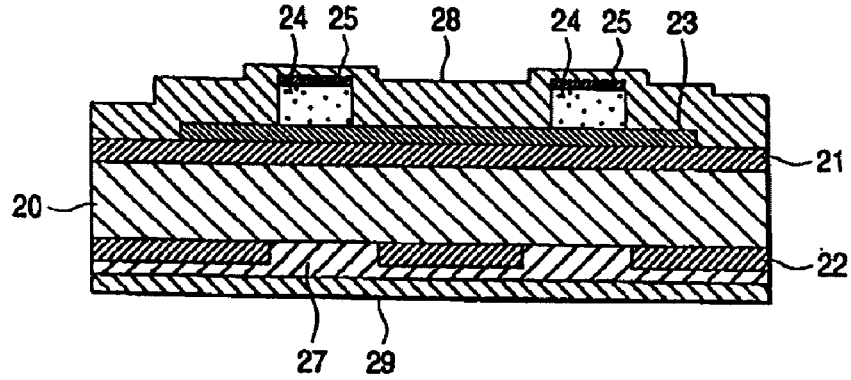

FIG. 6 - I
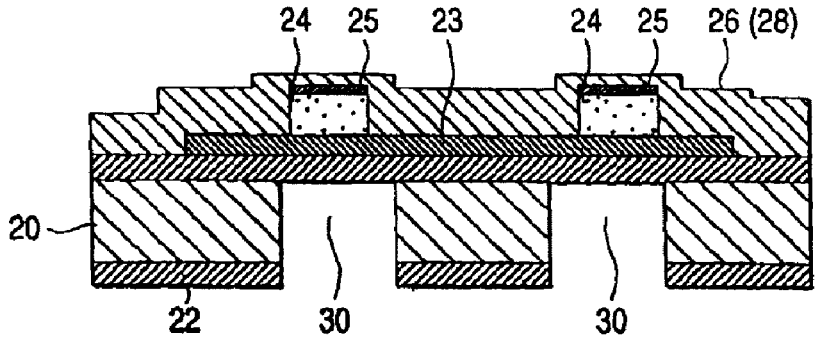
FIG. 6 - II
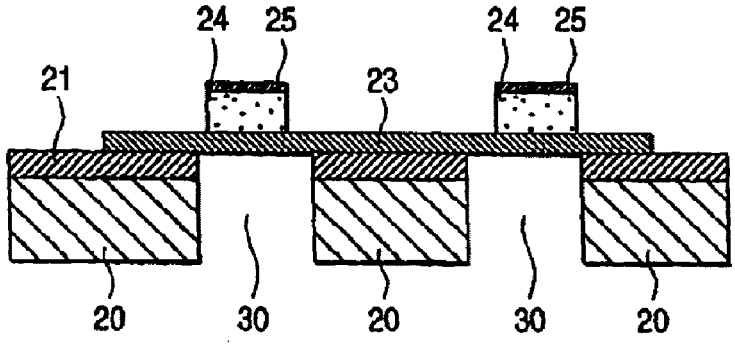
FIG. 6 - II'
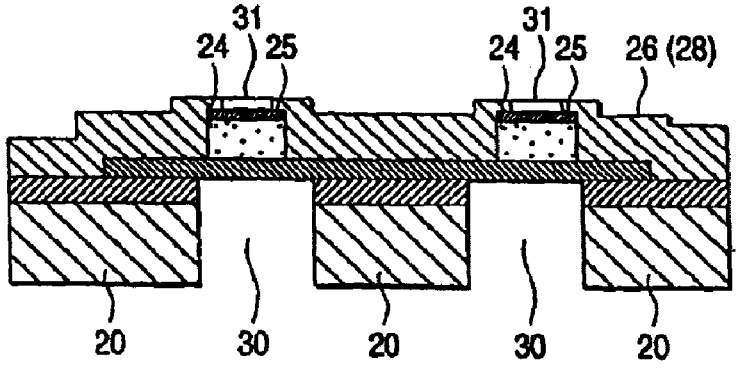

METHOD OF MANUFACTURING AN INK JET RECORDING HEAD HAVING REDUCED STRESS CONCENTRATION NEAR THE BOUNDARIES OF THE PRESSURE GENERATING CHAMBERS

Matter enclosed in heavy brackets [ ] appears in the original patent but forms no part of this reissue specification; matter printed in italics indicates the additions made by reissue.

*More than one reissue application has been filed for the reissue of U.S. Pat. No. 6,089,701. This is a divisional reissue application of U.S. Ser. No. 09/742,393 filed Dec. 22, 2000 (now abandoned), which was a reissue application of U.S. Ser. No. 08/835,748 filed Apr. 10, 1997, which issued as U.S. Pat. No. 6,089,701 on Jul. 18, 2000, the entire disclosures and contents of which are incorporated by reference herein.*

BACKGROUND OF THE INVENTION

The present invention relates to an ink-jet recording head having piezoelectric layers formed on a surface of an elastic sheet which forms part of pressure generating chambers communicating with nozzle orifices from which ink drops are allowed to issue by displacement of the piezoelectric layers.

The operating principle of ink-jet recording heads is such that the elastic sheet described above is displaced by means of piezoelectric vibrators to apply pressure to the ink in pressure generating chambers, thereby ejecting ink drops from nozzle orifices. Practically, ink-jet recording heads are classified as one of two types depending on the piezoelectric vibrator used; one type uses a vibrator of a longitudinally vibrating mode which extends and contracts along its own axis and the other type uses a vibrator of a flexing or flexural vibrating mode.

The first type of ink-jet recording heads is capable of changing the volume of each pressure generating chamber by contacting an end face of the piezoelectric vibrator with the elastic sheet and has the advantage of being suitable for high-density printing. On the other hand, the manufacturing process of this type of head is complicated since it involves not only a difficult step of segmenting the piezoelectric elastic sheet into a combtooth-shaped pattern in registry with the pitch on which nozzle orifices are arranged but also the step of fixing the individual piezoelectric vibrators in an appropriate positional relationship with the respective pressure generating chambers.

In contrast, the second type of ink-jet recording heads has the advantage of enabling the piezoelectric vibrators to be mounted on the elastic sheet by a relatively simple process in which a green sheet of piezoelectric material is attached to a substrate is conformity with the shape of individual pressure generating chambers and baked. On the other hand, a certain area is required to permit flexural vibrations and this introduces difficulty in achieving high-density arrangement of piezoelectric vibrators.

To deal with these problems, it has been proposed as in Unexamined Published Japanese Patent Application No. Hei. 5-286131 that a uniform layer of piezoelectric material be formed over the entire surface of the elastic sheet by film deposition techniques and that the formed piezoelectric layer be segmented into shapes that correspond to the pressure generating chambers by lithographic techniques such that the piezoelectric vibrator formed in one pressure generating chamber is independent of the vibrator formed in another pressure generating chamber.

This proposal eliminates the need to attach the piezoelectric vibrators onto the elastic sheet and offers the advantage of not only enabling the piezoelectric vibrators to be mounted by the precise and yet simple lithographic techniques but also reducing the thickness of each piezoelectric vibrator by a sufficient amount to permit fast driving.

On the other hand, the piezoelectric layer is so thin that compared to the attached type of piezoelectric vibrator, the rigidity is small enough to increase the chance of stress concentration near the boundaries of each pressure generating chamber and this causes the disadvantage of shortening the life of the elastic sheet, piezoelectric vibrators and even the electrodes.

As another problem, the piezoelectric constant is only about a third to half of the value for the piezoelectric vibrator that is formed by baking an attached green sheet and this requires driving at high voltage; then, both the upper and lower electrodes will experience surface discharge along the lateral sides of the piezoelectric layer which increases the chance of a leakage current of flowing between the two electrodes, thereby destabilizing the issuance of ink droplets. A further problem is that if the piezoelectric vibrator is segmented or divided in correspondence with individual pressure generating chambers, the areas of lateral sides that are exposed to air atmosphere are increased so that the individual piezoelectric vibrators are prone to deteriorate due to the moisture in air atmosphere.

SUMMARY OF THE INVENTION

The present invention has been accomplished under these circumstances and has as an object providing an ink-jet recording head in which the stress concentration near the boundaries of each pressure generating chamber is sufficiently reduced to prevent the breakage of the upper electrode.

Another object of the invention is to provide an ink-jet recording head which, in addition to the stated advantage, is capable of preventing not only the occurrence of a leakage current through the piezoelectric layer held between the upper and lower electrodes to thereby stabilize the issuance of ink droplets, but also the deterioration of piezoelectric vibrators.

According to a first aspect of the invention, there is provided an ink-jet recording head comprising: an elastic sheet providing pressure generating chambers; nozzle orifices, each communicating with the pressure generating chamber; piezoelectric vibrators formed on the elastic sheet, each of the piezoelectric vibrators having, a lower electrode formed on the elastic sheet, a piezoelectric layer formed on the lower electrode, and an upper electrode formed on the piezoelectric layer such that the upper electrode faces the respective pressure generating chamber, wherein the upper electrodes of the piezoelectric vibrators are positioned independently of each other; an electrical insulator layer having windows, wherein the electric insulator layer covers the upper electrodes; and a conductor pattern connecting with the upper electrodes via the windows of the electrical insulator layer.

Therefore, the upper electrodes are situated inward of the pressure generating chambers, so they will not experience any abrupt displacements at the boundaries of the pressure generating chambers and hence are damage-free.

According to a second aspect of the invention, there is provided an ink-jet recording head comprising: an elastic sheet providing pressure generating chambers; nozzle orifices, each communicating with the pressure generating chamber; piezoelectric vibrators formed on the elastic sheet, each of the piezoelectric vibrators having, a lower electrode formed on the elastic sheet, a piezoelectric layer formed on the lower electrode, and an upper electrode formed on the piezoelectric layer such that the upper electrode faces the respective pressure generating chamber, wherein the piezoelectric layer and the upper electrodes are formed inside of the areas facing the respective pressure generating chamber; an electrical insulator layer having windows, wherein the electrical insulator layer covers the upper electrodes; and a conductor pattern connecting with the upper electrodes via the windows of the electrical insulator layer.

The second aspect is effective not only in preventing the stress concentration due to the abrupt displacement at the boundaries of each of the pressure generating chambers, but also in ensuring good electrical insulation between the upper and lower electrodes and complete isolation from air atmosphere by means of the electrical insulator layer.

BRIEF DESCRIPTION OF THE DRAWINGS

FIGS. 5-I to 5-II' show the second half of a method of processing a single-crystal silicon substrate to fabricate the ink-jet recording head of the invention;

FIG. 6-I to 6-II' show the second half of the processing method;

DETAILED DESCRIPTION OF THE PREFERRED EMBODIMENTS

The present invention will now be described in detail with reference to the embodiments shown in accompanying drawings.

Figure 1:
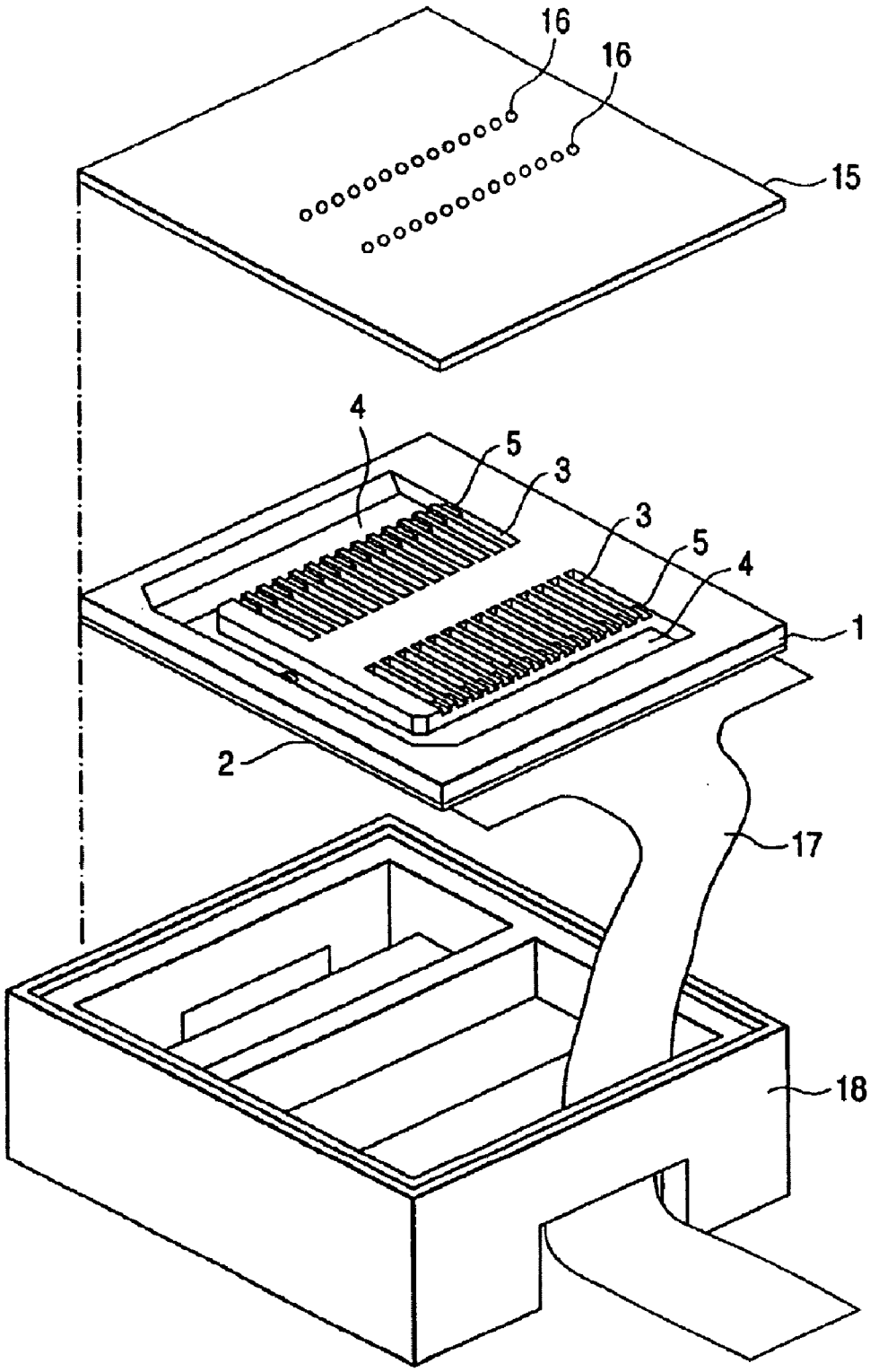
FIG. 1 is an exploded perspective view of an ink-jet recording head according to an embodiment of the invention.
Figure 2A:
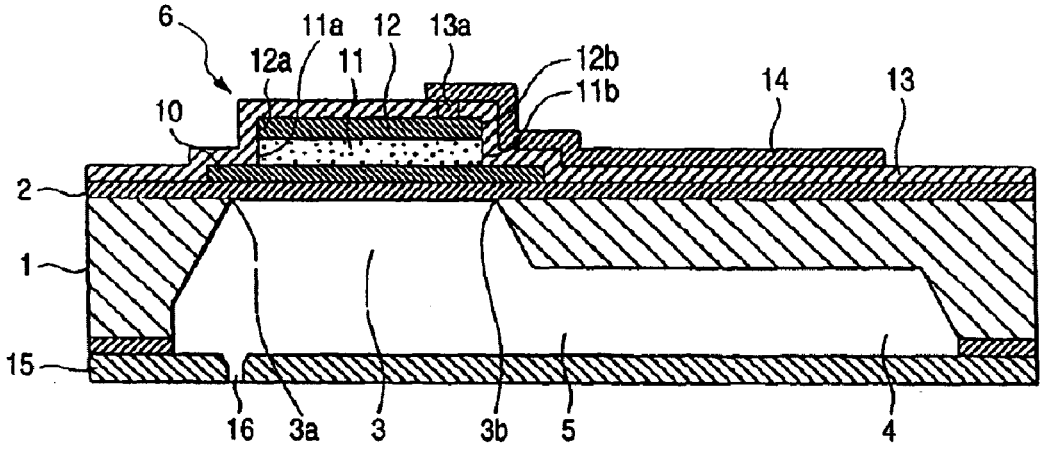
FIG. 2A shows the structure of a longitudinal section of a single pressure generating chamber in the ink-jet recording head.
Figure 2B:
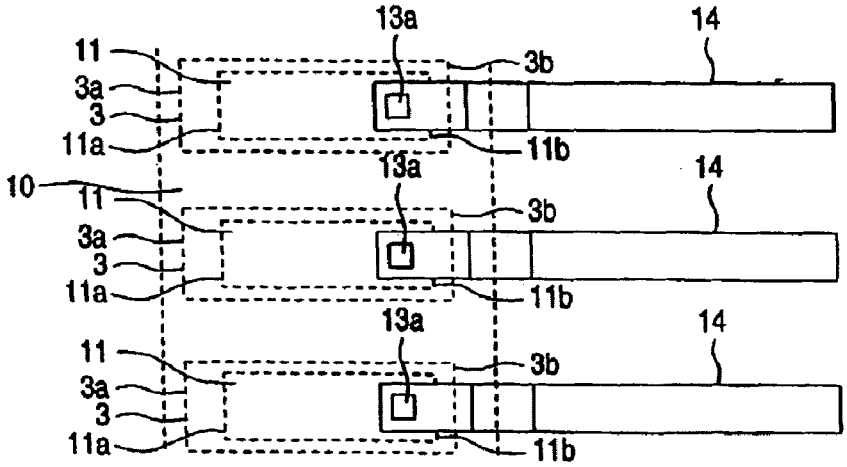
FIG. 2B shows the layout of conductor patterns with particular reference to the relative positions of pressure generating chambers, upper electrodes and a lower electrode.

FIG. 1 is an exploded perspective view of an embodiment of the invention and FIGS. 2A and 2B show the structure of a section of one pressure generating chamber as taken in the longitudinal direction. In these figures, numeral 1 refers to an ink channel forming substrate which is open on one side and provided on the other side with an elastic sheet 2 of silicon oxide. The substrate 1 is a single-crystal silicon substrate which is etched anisotropically to from pressure generating chambers 3 and reservoirs 4, as well as ink supply ports 5 in the form of recesses that communicate with the pressure generating chambers 3 and reservoirs 4 through a certain resistance to fluid flow.

Those areas of the elastic sheet 2 which face the individual pressure generating chambers 3 are provided with piezoelectric vibrators 6 that are mounted independently of each other by a film deposition technique in the respective generating pressure chambers 3.

Each piezoelectric vibrator 6 comprises in superposition of a lower electrode 10 formed on a surface of the elastic sheet 2 to cover the substantial areas of each pressure generating compartment 3 and each ink supply port 5, a piezoelectric layer 11 formed in such a way that it does not extend beyond the area of the pressure generating chamber 3 in which the elastic sheet 2 is exposed and such that it is slightly narrower than the width of the pressure generating chamber 3, and an upper electrode 12 formed on a surface of each piezoelectric layer 11.

As shown clearly in FIGS. 2A and 2B, the piezoelectric layers 11 and upper electrodes 12 are each formed in such a way that the sides 11a and 12a on the nozzle orifice side and the sides 11b and 12b on the ink supply port side are each located inward of the boundaries 3a and 3b of the pressure generating chamber 3 in a longitudinal direction and desirably inward of the partition walls of each pressure generating chamber in the direction of width.

A thin electrical insulator layer 13 is formed to cover at least the peripheral edge of the top surface of the upper electrode 12 and the lateral sides of the piezoelectric layer 11. The insulator layer 13 is formed of any material that permits film formation by a suitable deposition technique or which can be trimmed by etching as exemplified by silicon oxide, silicon nitride or an organic material, preferably a photosensitive polyimide having low rigidity and good electrical insulating property.

A window 13a is formed in a selected area of the upper electrode 12 on the insulator layer 13 to have the upper electrode 12 partly exposed to establish connection to a conductor pattern 14. One end of the conductor pattern 14 is connected to the upper electrode 12 via the window 13a and the other end extends to a suitable connection terminal. The conductor pattern 14 is formed in the smallest possible width that ensures positive supply of a drive signal to the upper electrode 12.

Shown by 15 is a nozzle plate with nozzle orifice 16 that communicate with the pressure generating chambers 3 at one end; the nozzle plate 15 is fixed in such a way as to close the open side of the ink channel forming substrate 1. Shown by 17 in FIG. 1 is a flexible cable for supplying a drive signal to the piezoelectric vibrators 6 and numeral 18 designates a head case.

In the embodiment under discussion, a drive signal supplied from an external drive circuit to each piezoelectric vibrator 6 via the flexible cable 17 passes through the conductor pattern 14 to be applied to the upper electrode 12, whereupon the piezoelectric vibrator 6 flexes to reduce the volume of the pressure generating chamber 3.

As a result of this volume change, the ink in the pressure generating chamber 3 is given a sufficient pressure to be partly ejected as an ink drop from the nozzle orifice 16.

When the issuance of the ink drop ends, the piezoelectric vibrator 6 reverts to the initial sate, whereupon the volume of the pressure generating chamber 3 increases to allow the ink in the reservoir 4 to flow into the pressure generating chamber 3 via the ink supply port 5.

As already mentioned, the piezoelectric layer 11, which is a component of each piezoelectric vibrator 6, is formed in such a size that the two ends 11a and 11b are located inward of the boundaries 3a and 3b of the pressure generating chamber 3. In other words, no part of the piezoelectric layer 11 or the upper electrode 12 is positioned at the boundary 3b and subject to the effect of a sharp displacement gradient. Hence, the piezoelectric layers 11 and the upper electrodes 12 are entirely free from breaking due to mechanical fatigue.

Figure 8:
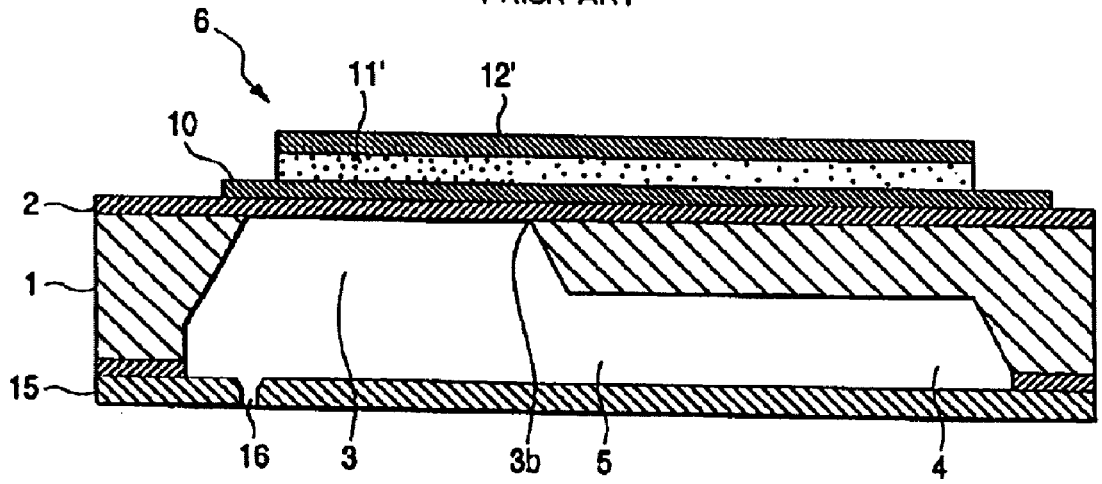
FIG. 8 PRIOR ART
FIG. 8 is a longitudinal section of an exemplary ink-jet recording head that employs flexing vibrators.

FIG. 8 shows a conventional type of ink-jet recording head in which a piezoelectric layer 11' extends near to an end portion of the head to serve as an insulator layer between the lower electrode 10 and an upper electrode 12', of which an extension is used as a lead-out electrode. In this case, the piezoelectric layer 11' is located at the end 3b of the pressure generating chamber 3 and a sharp displacement gradient will occur in the area of the piezoelectric layer 11' which faces the boundary 3b to thereby increase the chance of the piezoelectric vibrator 6 of breaking.

Returning back to the invention, the conductor pattern 14 connected to the upper electrode 12 is formed on a surface of the insulator layer 13 and has a sufficient spacing from the lower electrode 10 to provide the necessary insulation resistance for preventing surface discharge; in addition, the static capacity and the piezoelectric loss are reduced to such low levels that one can avoid the drop in response speed and prevent heat generation.

Further in addition, the piezoelectric layer 11, which will readily change in piezoelectric constant and other characteristics upon moisture absorption has the top surface isolated from air atmosphere by means of the upper electrode 12 and the insulator layer 13, which are both formed of a dense film, whereas the lateral sides of the piezoelectric layer 11 are isolated from air atmosphere by means of the insulator layer 13. Therefore, the piezoelectric layer 11 will not absorb moisture but can maintain its initial characteristics for a prolonged time.

Figure 3A:
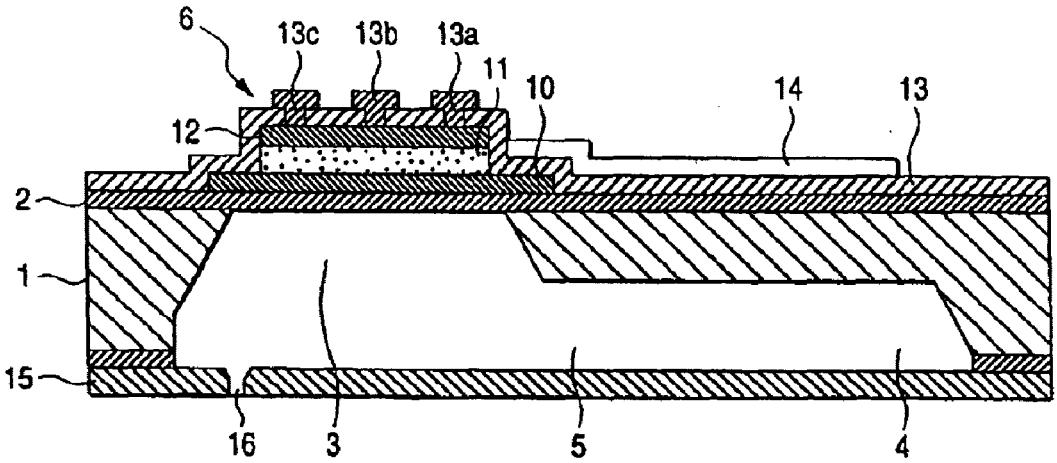
FIG. 3A shows the structure of a longitudinal section of a single pressure generating chamber in an ink-jet recording head according to another embodiment of the invention.
Figure 3B:
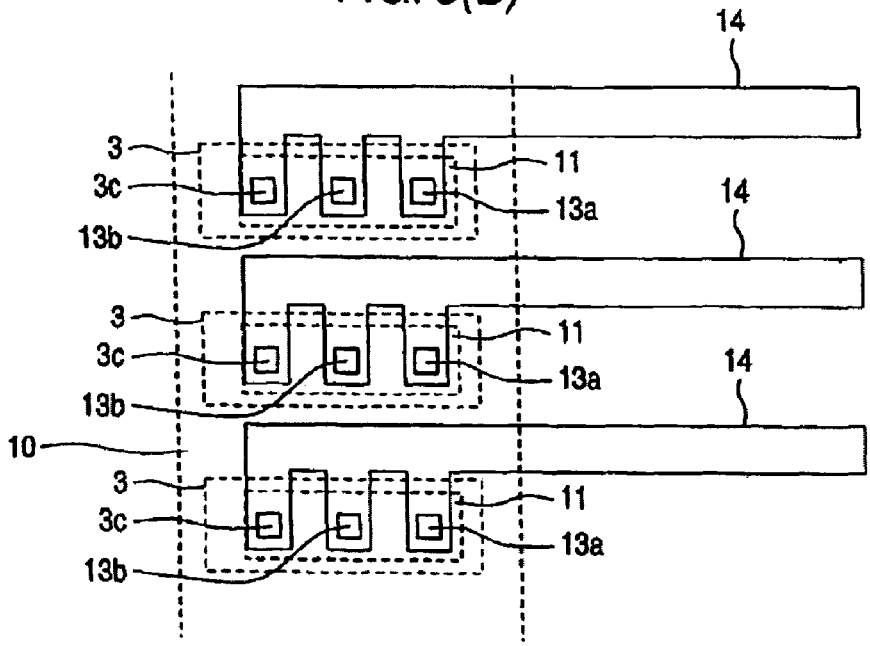
FIG. 3B shows the layout of conductor patterns with reference to the relative positions of pressure generating chambers, upper electrodes and a lower electrode.

In the embodiment described above, the conductor pattern 14 is connected to only one end of the upper electrode 12. This is not the sole case of the invention and, as shown in FIGS. 3A and 3B, the conductor pattern 14 may extend to a lateral side of the upper electrode 12 and a plurality of windows 13a, 13b and 13c are formed in the insulator layer 13 facing the upper electrodes 12, such that the conductor pattern 14 is connected to the upper electrode 12 via these windows 13a to 13c. This design is effective in supplying a drive signal to the upper electrode 12 with the smallest possible response delay.

Figure 4A:
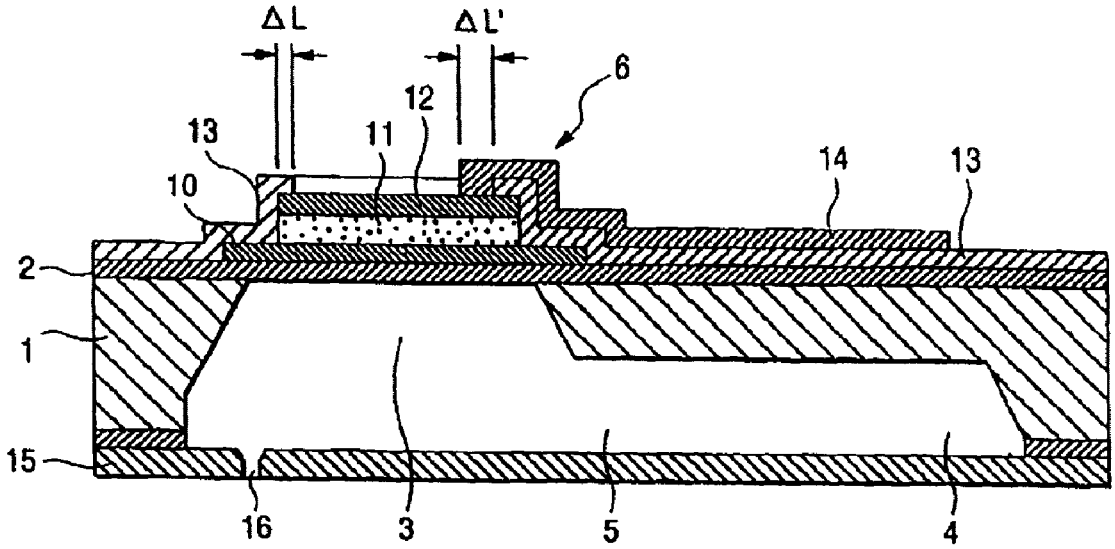
FIG. 4A shows the structure of a longitudinal section of a pressure generating chamber in an ink-jet recording head according to yet another embodiment of the invention.
Figure 4B:
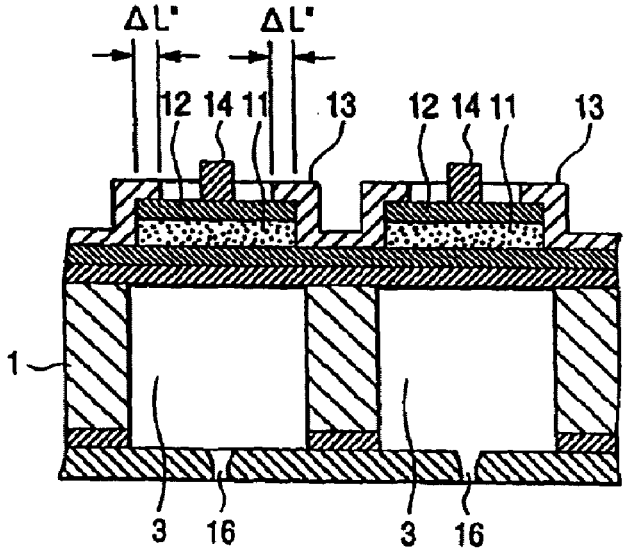
FIG. 4B shows the structure of two pressure generating chambers in a section that is taken in a direction in which they are oriented side by side.

In the embodiment shown described above, windows 13a, 13b and 13c are formed in the insulator layer 13 in conformity with the shape of the connections to the conductor pattern 14. Alternatively, windows larger than the connections to the conductor pattern 14 may be formed in the insulator layer 13 in all areas except selected portions $\Delta L$, $\Delta L'$ and $\Delta L''$ of the periphery of the top surface of the upper electrode as shown in FIGS. 4A and 4B. Even in this case, the piezoelectric layer 11 has its surface covered with the upper electrode 12 which is formed of a dense film of platinum or any other suitable metal whereas the lateral sides of the piezoelectric layer 11 are covered with the insulator layer 13 such that the piezoelectric layer 11 is entirely isolated from air atmosphere to prevent the deterioration by atmospheric moisture or the like and the surface discharge occurring along the lateral sides.

The windows in the insulator layer occupy the greater part of the displacement region of the piezoelectric layer 11 and only the upper electrode 12 is superposed on that region of the piezoelectric layer 11; as a result, the increase in rigidity due to the rigidity of the insulator layer 13 is minimized to permit the piezoelectric layer 11 to be displaced by a greater amount per unit voltage than in the previous embodiments.

The recording heads of the types described above can basically be fabricated by anisotropic etching of a single-crystal silicon substrate used as a preform and processed as described below with reference to FIGS. 5 and 6.

First, the opposite surfaces of the single-crystal silicon substrate 20 are thermally oxidized or otherwise processed to form silicon oxide films 21 and 22. A conductive layer 23 working both as a diaphragm and as a lower electrode is formed by sputtering Pt on one side of the substrate to prepare a preform. A piezoelectric layer 24 typically made of PZT (lead zirconate-titanate) is formed on a surface of the conductive layer 23 and a conductive layer is also formed as an upper electrode successively. In the next step, both the upper electrode and the piezoelectric layer are etched successively by a photo-lithographic technique in conformity with the shape of the pressure generating chambers. Subsequently, the lower electrode is patterned by a photo-lithographic technique. Further in addition, the silicon oxide film 22 on the other side of the single-crystal silicon substrate 20 is patterned by a photo-lithographic technique in conformity with the shape of the pressure generating chambers. Hydrofluoric acid is used as an etchant to etch the silicon oxide film 22 during the patterning process and the piezoelectric layer 24 can effectively be protected from the hydrofluoric acid by simply coating a resist on the layer (FIG. 5-I).

In the next step, a fluoroplastic protective film 26 is formed in a thickness of about 6 μm over the piezoelectric layer 24 and the conductive layers 23 and 25 (FIG. 5-II).

A suitable fluoroplastic resin is whirl coated in a thickness of about 2 μm and dried by heating at 120° C. for 20 min. By repeating these procedures three times, the desired protective film 26 can be formed in intimate contact with the piezoelectric layer 24 and the conductive layers 23 and 25 with the degree of polymerization being adequately increased.

Another method of forming the fluoroplastic protective film 26 is shown in FIG. 5-II'. A suitable resin film 27 is attached to the other side of the preform and the entire assembly is immersed in a fluoroplastic resin solution such that the latter is deposited to cover the piezoelectric layer 24 and the conductive layers 23 and 25. The deposited fluoroplastic coating 28 is preannealed at 100° C. for about 30 min, then heated at 200° C. for 30 min until the coating 28 cures to such a hardness that it can serve as a protective film. When the formation of the fluoroplastic protective film 28 ends, the resin film 27 may be stripped off, whereupon the unwanted areas of the fluoroplastic protective film 29 are also removed.

The patterned silicon oxide film 22 is immersed in a 5 to 20 wt % aqueous potassium hydroxide solution held at 80° C. to perform etching for about 1 to 2 h. As a result, with the silicon oxide film 22 serving as a protective layer, etching goes through the single-crystal silicon substrate until it stops at the silicon oxide film 21 on the other side, to thereby form recesses 30 which serve as pressure generating chambers (FIG. 6-I). In this step, the fluoroplastic protective film 28 effectively prevents the piezoelectric layer from being damaged by the aqueous potassium hydroxide solution.

Subsequently, those areas of the silicon oxide film 21 serving as an etching stopper which are exposed in the recesses 30 and the silicon oxide film 22 serving as an anisotropic etching pattern are stripped away with a hydrofluoric acid solution or a liquid mixture of hydrofluoric acid and ammonia. Finally, the fluoroplastic film 26 (28) is etched away with an oxygen plasma (FIG. 6-II).

If desired, the etching may be performed in such a way that windows 31 are formed in at least those areas of the fluoroplastic film 26 (28) on top of the conductive layer 25 serving as the upper electrode which provide connections to the conductor pattern whereas the resin film 26 (28) remains intact on the lateral sides of the piezoelectric layer 24. In this way, the fluoroplastic film 26 (28) is adapted to function just like the insulator layer 13 used in the previous embodiments (FIG. 6-II').

Needless to say, if the fluoroplastic protective film 26 (28) is entirely stripped away as in the case shown in FIG. 6-II, an insulator film 13 may be additionally formed in the manner already described above.

Figure 7:
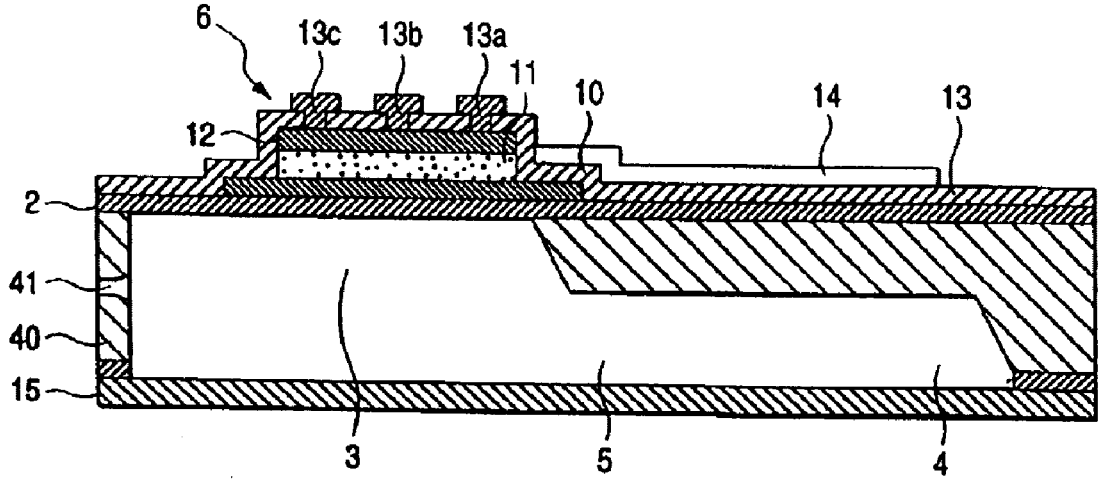
FIG. 7 is a longitudinal section of another type of ink-jet recording head to which the electrode structure of the invention is applicable in accordance with a further embodiment of the invention.

In the foregoing embodiments, the recording head is of a face type in which nozzle orifices 16 are formed in a direction perpendicular to the head face. Obviously, the concept of the invention is equally applicable to an edge-type head which, as shown in FIG. 7, has nozzle orifices 41 bored through an end face 40 of the head, particularly in the pressure generating chamber constituting member such as an ink channel forming substrate, in such a way that they communicate with the ink channels.

Further in addition, the foregoing embodiments concern the case where the piezoelectric vibrators are formed by a film-deposition technique but, obviously, the same advantage will be attained if a green sheet of a piezoelectric material is cut to shapes that conform to the pressure generating chambers, attached to an elastic sheet and backed to form piezoelectric layers.

As described on the foregoing pages, the present invention provides an ink-jet recording head having piezoelectric vibrators comprising a lower electrode formed on a surface of an elastic sheet providing pressure generating chambers communicating with nozzle orifices, piezoelectric layers formed on a surface of said lower electrode and upper electrodes formed on surfaces of said piezoelectric layers in the areas facing said pressure generating chambers, wherein said upper electrodes are formed independently of each other in the areas facing said pressure generating chambers and wherein an electrical insulator is formed such that it covers an area extending from the peripheral edge portion of the top surface of each of said upper electrodes to the lateral sides of each of said piezoelectric layers, with a window being left intact to provide at least a connection to a conductor pattern. In this design, the upper electrodes are located inward of the pressure generating chambers and are not subject to abrupt displacements at the boundaries of the pressure generating chambers; therefore, the upper electrodes are effectively prevented from being open-circuited. In addition, the piezoelectric vibrators are effectively covered with the insulator layer to prevent not only the occurrence of surface discharge between the upper and lower electrodes but also the deterioration due to moisture absorption.

What is claimed is:

[1. An ink jet recording head comprising:

an elastic sheet facing pressure generating chambers;

nozzle orifices communicating with the pressure generating chambers;

piezoelectric vibrators formed on the elastic sheet, each of the piezoelectric vibrators having, a lower electrode formed on the elastic sheet, a piezoelectric layer formed on the lower electrode, and an upper electrode formed on the piezoelectric layer such that the upper electrode faces a respective pressure generating chamber, wherein the upper electrodes of the piezoelectric vibrators are positioned independently of each other;

an insulator layer having windows, wherein the insulator layer is formed on a portion of the upper electrodes; and a conductor pattern connecting with the upper electrodes through the windows of the insulator layer.]

[2. The ink-jet recording head according to claim 1, wherein the conductor pattern is formed on a lateral side of the upper electrode between the pressure generating chambers and connected to said upper electrode at more than one site through the windows.]

[3. The ink-jet recording head according to claim 1, wherein the windows extend to a peripheral edge of each of the piezoelectric layers such that the windows do not interfere with the displacement of the vibrating region of the piezoelectric layer.]

[4. The ink-jet recording head according to claim 1, wherein the insulator layer is made of either one of a silicon oxide, a silicon nitride and an organic material.]

[5. The ink-jet recording head according to claim 4, wherein the insulator layer is made of a polyimide.]

[6. An ink-jet recording head according to claim 1, wherein the insulator layer is formed of an etchant resistant film which is used as a protective film at etching.]

[7. An ink jet recording head comprising:

an elastic sheet facing pressure generating chambers;

nozzle orifices communicating with the pressure generating chambers;

piezoelectric vibrators formed on the elastic sheet, each of the piezoelectric vibrators having, a lower electrode formed on the elastic sheet, a piezoelectric layer formed on the lower electrode, and an upper electrode formed on the piezoelectric layer such that the upper electrode faces the respective pressure generating chamber, wherein the piezoelectric layer and the upper electrode are formed entirely inside of areas facing the respective pressure generating chamber;

an insulator layer having windows, wherein the insulator layer is formed on a portion of the upper electrodes; and a conductor pattern connecting with the upper electrodes through the windows of the insulator layer.]

[8. The ink-jet recording head according to claim 7, wherein the conductor pattern is formed on a lateral side of the upper electrode between the pressure generating chambers and connected to said upper electrode at more than one site through the windows.]

[9. The ink-jet recording head according to claim 7, wherein the windows extend to a peripheral edge of each of the piezoelectric layers such that the windows do not interfere with the displacement of the vibrating region of the piezoelectric layer.]

[10. The ink-jet recording head according to claim 7, wherein the insulator layer is made of either one of a silicon oxide, a silicon nitride and an organic material.]

[11. The ink-jet recording head according to claim 10, wherein the insulator layer is made of a polyimide.]

[12. An ink-jet recording head according to claim 7, wherein the insulator layer is formed of an etchant resistant film which is used as a protective film at etching.]

*13. A method of forming an ink jet recording head, comprising an elastic sheet facing pressure generating chambers, nozzle orifices communicating with the pressure generating chambers, and piezoelectric vibrators formed on the elastic sheet by a film deposition technique, said method comprising:*

*forming a lower electrode on the elastic sheet;*

*defining a first area in a longitudinal direction of each of the pressure generating chambers;*

*defining a second area in a width direction of each of the pressure generating chambers;*

*forming a piezoelectric layer on the lower electrode; and*

*forming an upper electrode on the piezoelectric layer,*

*wherein an area where said lower electrode, said piezoelectric layer and said upper electrode overlap is located within said first area, and*

*an area of each of said pressure generating chambers is gradually increased in the longitudinal direction away from said area of overlap.*

*14. A method of forming the ink jet recording head of claim 13, wherein the piezoelectric layer is formed in each of the pressure generating chambers.*

*15. A method of forming the ink jet recording head of claim 13, wherein the upper electrode is formed in a substantially same shape as the piezoelectric layer.*

*16. A method of forming the ink jet recording head according to claim 13, said method further comprising:*

*forming, on a portion of the upper electrodes, an insulator layer having windows; and*

*forming a conductor pattern connecting with the upper electrodes through the windows of the insulator layer.*

*17. A method of forming the ink-jet recording head according to claim 16, wherein the conductor pattern is formed on a lateral side of the upper electrode between the pressure generating chambers and connected to said upper electrode at more than one site through the windows.*

*18. A method of forming the ink-jet recording head according to claim 16, wherein the windows extend to a peripheral edge of each of the piezoelectric layers such that the windows do not interfere with the displacement of the vibrating region of the piezoelectric layer.*

*19. A method of forming the ink-jet recording head according to claim 16, wherein the insulator layer is made of either one of a silicon oxide, a silicon nitride and an organic material.*

*20. A method of forming the ink-jet recording head according to claim 19, wherein the organic material of the insulator layer is polyimide.*

*21. A method of forming the ink jet recording head according to claim 13, said method further comprising:*

*forming, on a portion of the upper electrodes, an insulator layer having windows; and*

*forming a conductor pattern connecting with the upper electrodes through the windows of the insulator layer,*

*wherein the piezoelectric layer and the upper electrode are formed entirely inside of areas facing the respective pressure generating chamber.*

*22. A method of forming the ink-jet recording head according to claim 21, wherein the conductor pattern is formed on a lateral side of the upper electrode between the pressure generating chambers and connected to said upper electrode at more than one site through the windows.*

*23. A method of forming the ink-jet recording head according to claim 21, wherein the windows extend to a peripheral edge of each of the piezoelectric layers such that the windows do not interfere with the displacement of the vibrating region of the piezoelectric layer.*

*24. A method of forming the ink-jet recording head according to claim 21, wherein the insulator layer is made of either one of a silicon oxide, a silicon nitride and an organic material.*

*25. A method of forming the ink-jet recording head according to claim 24, wherein the organic material of the insulator layer is polyimide.*

*26. A method of forming the ink-jet recording head according to claim 21, wherein the insulator layer is formed of an etchant resistant film which is used as a protective film at etching.*

*27. A method of forming the ink jet recording head of claim 13, further comprising forming said pressure generating chambers in a silicon substrate.*

*28. A method of forming an ink jet recording head, comprising*

*an elastic sheet facing pressure generating chambers, nozzle orifices communicating with the pressure generating chambers, and piezoelectric vibrators formed on the elastic sheet, said method comprising:*

*forming a lower electrode on the elastic sheet;*

*forming a piezoelectric layer on the lower electrode;*

*forming an upper electrode on the piezoelectric layer such that the upper electrode faces a respective pressure generating chamber, wherein the upper electrodes of the piezoelectric vibrators are positioned independently of each other;*

*forming on a portion of the upper electrodes, an insulator layer having windows; and*

*forming a conductor pattern connecting with the upper electrodes through the windows of the insulator layer.*

*29. A method of forming the ink-jet recording head according to claim 28, wherein the conductor pattern is formed on a lateral side of the upper electrode between the pressure generating chambers and connected to said upper electrode at more than one site through the windows.*

*30. A method of forming the ink-jet recording head according to claim 28, wherein the windows extend to a peripheral edge of each of the piezoelectric layers such that the windows do not interfere with the displacement of the vibrating region of the piezoelectric layer.*

*31. A method of forming the ink-jet recording head according to claim 28, wherein the insulator layer is made of either one of a silicon oxide, a silicon nitride and an organic material.*

*32. A method of forming the ink-jet recording head according to claim 31, wherein the organic material of the insulator layer is polyimide.*

*33. A method of forming the ink-jet recording head according to claim 28, wherein the insulator layer is formed of an etchant resistant film which is used as a protective film at etching.*

*34. A method of forming the ink-jet recording head according to claim 16, wherein the insulator layer is formed of an etchant resistant film which is used as a protective film at etching.*

*35. A method of forming an ink jet recording head, comprising*

*an elastic sheet facing pressure generating chambers, nozzle orifices communicating with the pressure gen-*

*erating chambers, and piezoelectric vibrators formed on the elastic sheet, said method comprising:*

*forming a lower electrode on the elastic sheet;*

*forming a piezoelectric layer on the lower electrode;*

*forming an upper electrode on the piezoelectric layer such that the upper electrode faces the respective pressure generating chamber, wherein the piezoelectric layer and the upper electrode are formed entirely inside of areas facing the respective pressure generating chamber;*

*forming, on a portion of the upper electrodes, an insulator layer having windows; and*

*forming a conductor pattern connecting with the upper electrodes through the windows of the insulator layer.*

*36. A method of forming the ink-jet recording head according to claim 35, wherein the conductor pattern is formed on a lateral side of the upper electrode between the pressure generating chambers and connected to said upper electrode at more than one site through the windows.*

*37. A method of forming the ink-jet recording head according to claim 35, wherein the windows extend to a peripheral edge of each of the piezoelectric layers such that the windows do not interfere with the displacement of the vibrating region of the piezoelectric layer.*

*38. A method of forming the ink-jet recording head according to claim 35, wherein the insulator layer is made of either one of a silicon oxide, a silicon nitride and an organic material.*

*39. A method of forming the ink-jet recording head according to claim 38, wherein the organic material of the insulator layer is polyimide.*

*40. A method of forming the ink-jet recording head according to claim 35, wherein the insulator layer is formed of an etchant resistant film which is used as a protective film at etching.*

*41. An ink-jet recording head comprising:*

*an elastic sheet facing pressure generating chambers;*

*nozzle orifices communicating with the pressure generating chambers;*

*piezoelectric vibrators formed on the elastic sheet, each of the piezoelectric vibrators comprising:*

*a lower electrode formed on the elastic sheet,*

*a piezoelectric layer formed on the lower electrode, and*

*an upper electrode formed on the piezoelectric layer such that the upper electrode faces a respective pressure generating chamber, wherein the upper electrodes of the piezoelectric vibrators are positioned independently of each other;*

*an insulator layer having windows, wherein the insulator layer is formed on a portion of the upper electrode; and*

*a conductor pattern connecting with the upper electrodes through the windows of the insulator layer.*

*42. The ink-jet recording head according to claim 41, wherein the conductor pattern is formed on a lateral side of the upper electrode between the pressure generating chambers and connected to said upper electrode at more than one site through the windows.*

*43. The ink-jet recording head according to claim 41, wherein the windows extend to a peripheral edge of each of the piezoelectric layers such that the windows do not interfere with the displacement of the vibrating region of the piezoelectric layer.*

*44. The ink-jet recording head according to claim 41, wherein the insulator layer is made of either one of a silicon oxide, a silicon nitride and an organic material.*

*45. The ink-jet recording head according to claim 44, wherein the insulator layer is made of a polyimide.*

*46. The ink-jet recording head according to claim 41, wherein the insulator layer is formed of an etchant-resistant film which is used as a protective film at etching.*

*47. An ink-jet recording head comprising:*

*an elastic sheet facing pressure generating chambers;*

*nozzle orifices communicating with the pressure generating chambers;*

*piezoelectric vibrators formed on the elastic sheet, each of the piezoelectric vibrators comprising:*

*a lower electrode formed on the elastic sheet,*

*a piezoelectric layer formed on the lower electrode, and*

*an upper electrode formed on the piezoelectric layer such that the upper electrode faces the respective pressure generating chamber, wherein the piezoelectric layer and the upper electrode are formed entirely inside of areas facing the respective pressure generating chamber;*

*an insulator layer having windows, wherein the insulator layer is formed on a portion of the upper electrodes; and*

*a conductor pattern connecting with the upper electrodes through the windows of the insulator layer.*

*48. The ink-jet recording head according to claim 47, wherein the conductor pattern is formed on a lateral side of the upper electrode between the pressure generating chambers and connected to said upper electrode at more than one site through the windows.*

*49. The ink-jet recording head according to claim 47, wherein the windows extend to a peripheral edge of each of the piezoelectric layers such that the windows do not interfere with the displacement of the vibrating region of the piezoelectric layer.*

*50. The ink-jet recording head according to claim 47, wherein the insulator layer is made of either one of a silicon oxide, a silicon nitride and an organic material.*

*51. The ink-jet recording head according to claim 50, wherein the insulator layer is made of a polyimide.*

*52. The ink-jet recording head according to claim 47, wherein the insulator layer is formed of an etchant-resistant film which is used as a protective film at etching.*

* * * * *